United States Patent
Chen (10) Patent No.: US 9,827,898 B2
(45) Date of Patent: Nov. 28, 2017

(54) VEHICLE LIGHT ASSEMBLY WITH MULTIPLE LIGHT ARRAYS

(71) Applicant: Optronics International, LLC, Tulsa, OK (US)

(72) Inventor: Chun-Chih Chen, Tainan (TW)

(73) Assignee: Optronics International, LLC, Tulsa, OK (US)

( * ) Notice: Subject to any disclaimer, the term of this patent is extended or adjusted under 35 U.S.C. 154(b) by 240 days.

(21) Appl. No.: 14/816,500

(22) Filed: Aug. 3, 2015

(65) Prior Publication Data
US 2017/0036591 A1 Feb. 9, 2017

(51) Int. Cl.
*F21V 7/00* (2006.01)
*B60Q 1/00* (2006.01)
*F21S 8/10* (2006.01)
*B60Q 1/26* (2006.01)
*F21Y 115/10* (2016.01)
*F21Y 105/18* (2016.01)

(52) U.S. Cl.
CPC ......... *B60Q 1/0052* (2013.01); *B60Q 1/2607* (2013.01); *B60Q 1/2696* (2013.01); *F21S 48/211* (2013.01); *F21S 48/215* (2013.01); *F21S 48/2212* (2013.01); *F21S 48/234* (2013.01); *F21S 48/236* (2013.01); *F21S 48/24* (2013.01); *F21Y 2105/18* (2016.08); *F21Y 2115/10* (2016.08)

(58) Field of Classification Search
CPC .. B60Q 1/0058; B60Q 1/0052; B60Q 1/2607; B60Q 1/2696; F21S 48/236; F21S 48/211
See application file for complete search history.

(56) References Cited

U.S. PATENT DOCUMENTS

| | | |
|---|---|---|
| 4,209,825 A | 6/1980 | Shackelford |
| 4,279,255 A | 7/1981 | Hoffman |
| 4,731,706 A | 3/1988 | Ricard |
| D299,550 S | 1/1989 | Payne |
| 4,862,519 A | 9/1989 | Bull |
| D358,674 S | 5/1995 | Ramsey |
| 5,508,894 A | 4/1996 | Payne et al. |
| 5,567,035 A | 10/1996 | Dobler et al. |
| 5,642,933 A | 7/1997 | Hitora |
| D382,659 S | 8/1997 | Kaloustian |
| D385,638 S | 10/1997 | Bonnette et al. |
| D386,805 S | 11/1997 | Bonnette et al. |
| D393,729 S | 4/1998 | Tuttle |
| D412,370 S | 7/1999 | Cece |
| D417,027 S | 11/1999 | Cece |
| D420,302 S | 2/2000 | Barnhart |
| D424,732 S | 5/2000 | Cece |
| 6,120,163 A | 9/2000 | Graber et al. |

(Continued)

*Primary Examiner* — Evan Dzierzynski
(74) *Attorney, Agent, or Firm* — Head, Johnson, Kachigian & Wilkinson, PC (57) ABSTRACT

A vehicle light assembly with multiple light arrays. The light assembly includes a base housing having a recess and an upstanding edge forming an open top. A light mounting board in the recess has a lower side and an opposed upper side. A first array of lights on the upper side of the mounting board projects light towards the open top. A second array of lights on the lower side of the mounting board projects lights away from the open top. A reflector received in the recess reflects light projected from the second array toward the open top.

19 Claims, 13 Drawing Sheets

(56) References Cited

U.S. PATENT DOCUMENTS

| | | | |
|---|---|---|---|
| 6,174,078 B1 | 1/2001 | Ohm et al. | |
| 6,329,927 B1 | 12/2001 | Hobson | |
| 6,352,359 B1 * | 3/2002 | Shie | F21S 48/1233 362/331 |
| 6,471,385 B1 * | 10/2002 | Emunds | F21V 17/164 362/438 |
| 6,533,445 B1 | 3/2003 | Rogers | |
| 6,619,815 B2 | 9/2003 | Southern, Jr. | |
| 6,644,829 B1 | 11/2003 | Tracy et al. | |
| 6,705,749 B1 | 3/2004 | Smith | |
| 6,739,735 B2 | 5/2004 | Talamo et al. | |
| D493,565 S | 7/2004 | Smith et al. | |
| 6,846,094 B2 | 1/2005 | Luk | |
| D505,224 S | 5/2005 | Smith et al. | |
| 6,910,791 B2 * | 6/2005 | Futami | B60Q 1/0052 362/299 |
| D507,066 S | 7/2005 | Smith | |
| D517,711 S | 3/2006 | Payne et al. | |
| 7,114,834 B2 | 10/2006 | Rivas et al. | |
| D551,786 S | 9/2007 | Smith | |
| D565,235 S | 3/2008 | Smith | |
| D585,516 S | 1/2009 | Smith | |
| D646,826 S | 10/2011 | Smith | |
| 9,062,845 B1 | 6/2015 | Tsai et al. | |
| 2002/0106931 A1 | 8/2002 | Hsien-Te | |
| 2004/0120160 A1 * | 6/2004 | Natsume | B60Q 1/0058 362/544 |
| 2012/0020104 A1 * | 1/2012 | Biebl | F21K 9/00 362/546 |

* cited by examiner

VEHICLE LIGHT ASSEMBLY WITH MULTIPLE LIGHT ARRAYS

BACKGROUND OF THE INVENTION

1. Field of the Invention

The present invention relates to a vehicle light providing an outer ring of defused light surrounding an inner ring of light wherein the outer ring of light and the inner ring of light indicate different functions.

2. Prior Art

Vehicle tail lights often serve multiple functions. These functions include a tail light function, providing continuous illumination; a stop light function providing illumination when the vehicle's brake is engaged; and a turn light function providing intermittent illumination while the turn signal is engaged. It is important for a tail light assembly to provide sufficient visual differentiation among the various functions.

Light emitting diodes (LEDs) have become commonplace both in vehicle head lights and in tail lights.

Applicant's prior patent, Tsai et al. (U.S. Pat. No. 9,062,845), illustrates an example of a vehicle light.

It would be desirable to provide a vehicle light assembly that provides separate rings of lights for different functions.

It would be further desirable to provide a vehicle light assembly having a single light mounting board to retain multiple arrays of lights for different functions.

It would be further desirable to provide a vehicle light assembly wherein the light arrays provide an even, diffused light.

SUMMARY OF THE INVENTION

The present invention is directed to a vehicle light assembly with multiple light arrays. The assembly includes a base housing having a recess and an upstanding edge. The upstanding edge forms a cylinder or tube with a closed bottom and an open top.

A light mounting board, substantially planar, fits within and is received within the base housing in the recess. The light mounting board includes a lower side and an opposed upper side.

A first array of lights is arranged on the upper side of the light mounting board which projects light upward from inside the recess toward the open top. A second array of lights on the opposed lower side of the mounting board projects light away from the open top toward the closed bottom of the housing.

A reflector is received in the recess of the housing and is juxtaposed between the closed bottom of the housing and the light mounting board. Accordingly, light projected from the second light array on the lower side of the mounting board is received on the reflector.

The reflector includes at least two reflective surfaces which are in angular relationship to each other. The reflective surfaces are also in angular relationship to the mounting board. The reflector includes a first reflective surface and an acute angle to the lower side of the mounting board. The reflector also includes a second reflective surface which is at an acute angle to the first reflective surface. Light passes from the second array of lights to the first reflective surface, thereafter to the second reflective surface, and thereafter to and through a diffuser lens. Finally, the ring of light passes through a cover lens.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
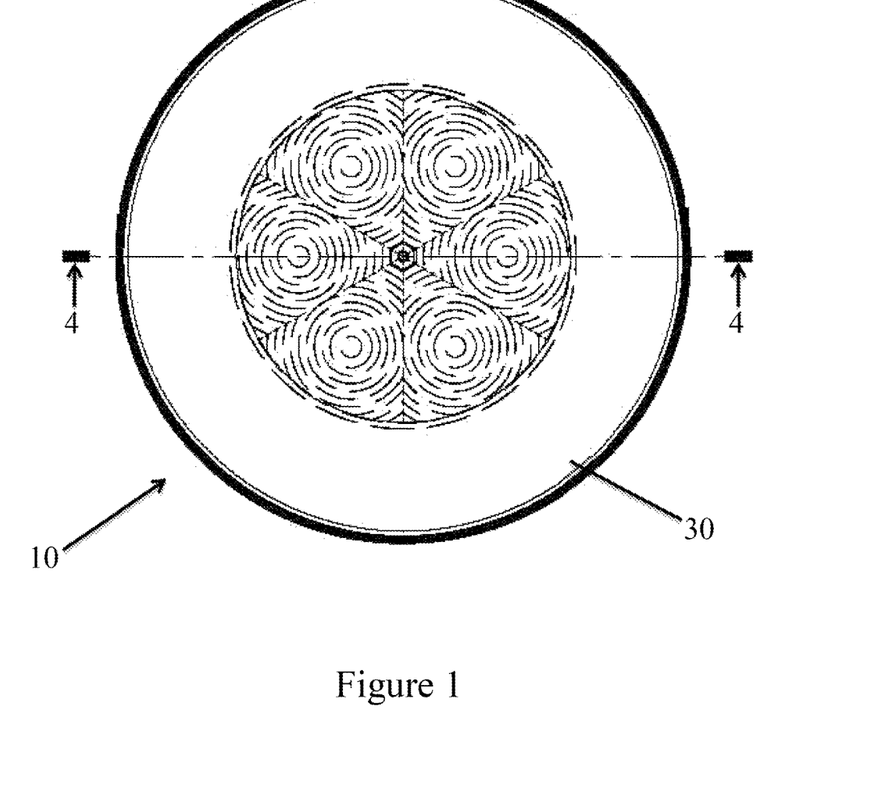
FIG. 1 illustrates a top view.
Figure 2:
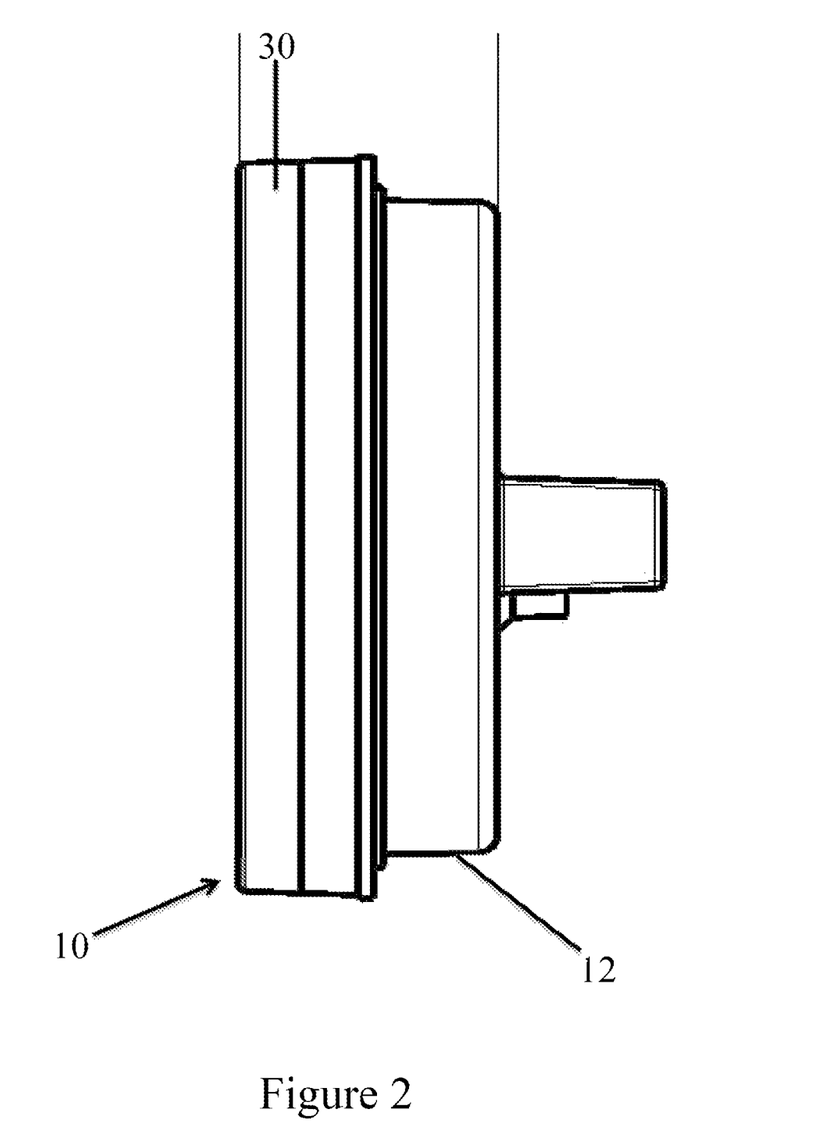
FIG. 2 illustrates a side view.
Figure 3:
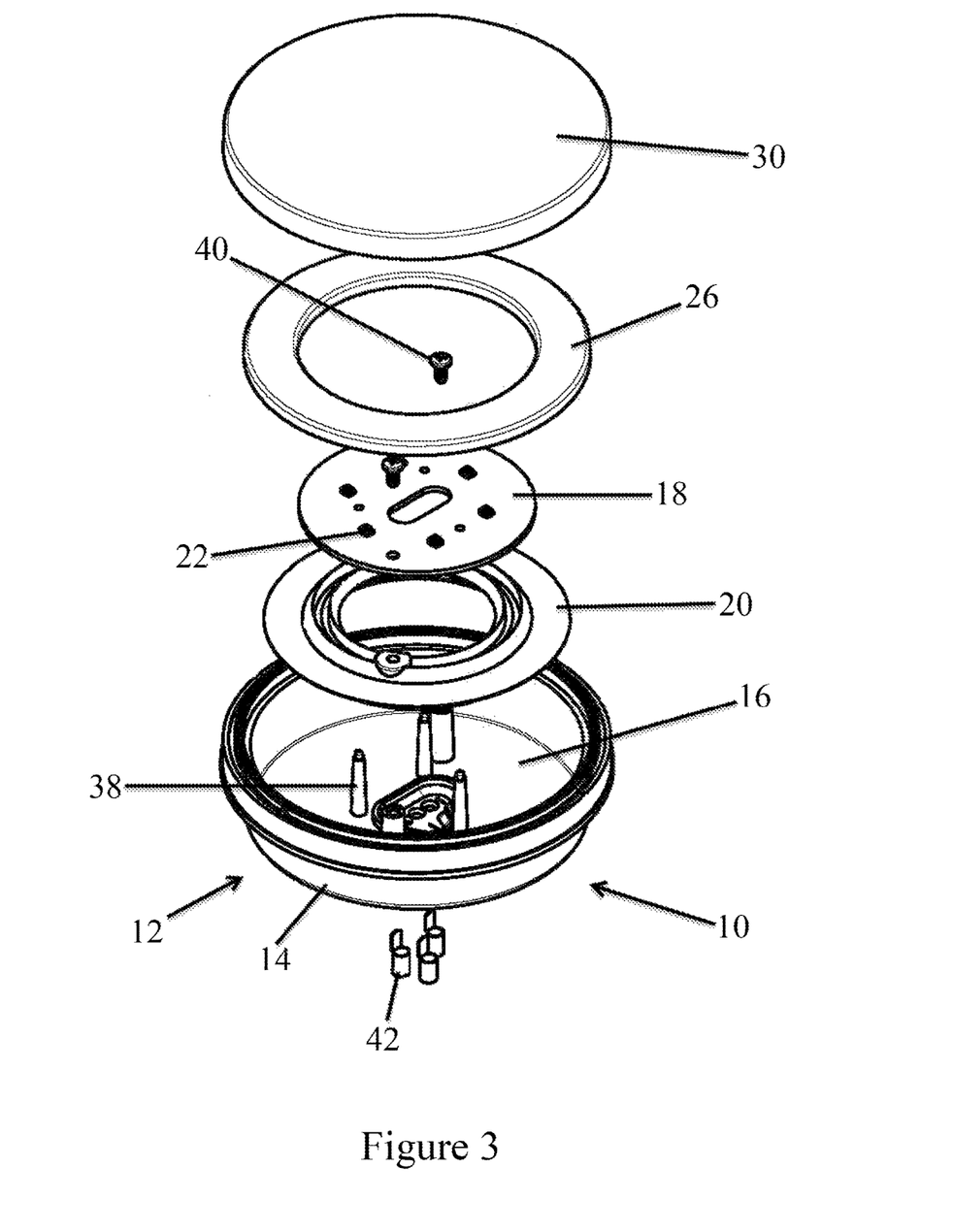
FIG. 3 illustrates an exploded view.
Figure 4:
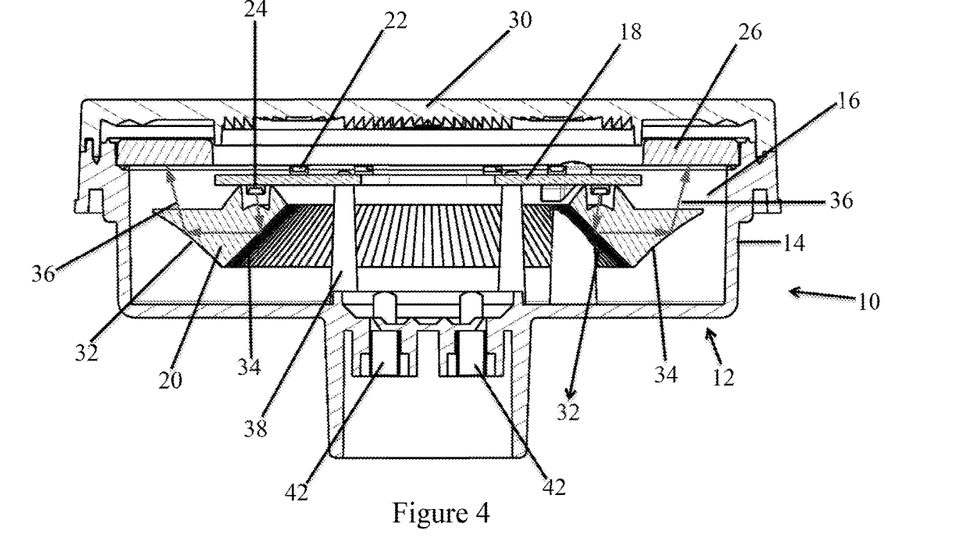
FIG. 4 illustrates a sectional view taken along section line 4-4 of FIG. 1 of a first embodiment of the vehicle light assembly with multiple light arrays constructed in accordance with the present invention.

Referring to the drawings in detail, FIG. 1 illustrates a top view, FIG. 2 illustrates a side view, FIG. 3 illustrates an exploded view, and FIG. 4 illustrates a sectional view taken along section line 4-4 of FIG. 1 of a first embodiment of a vehicle light assembly 10 with multiple light arrays. The assembly 10 includes a base housing 12 having a recess and an upstanding edge 14. In the embodiment shown, the upstanding edge 14 forms a cylinder with a closed bottom and an open top 16.

A light mounting board 18, which is substantially planar, fits within and is received within the base housing 12 in the recess. The light mounting board 18 includes a lower side and an opposed upper side, visible in FIGS. 3 and 4. The light mounting board 18 may be in the form of a printed circuit board or circuit boards.

A first array 22 of lights is arranged on the upper side of the light mounting board 18 which projects light upward from in the recess toward the open top 16. A second array 24 of lights on the opposed lower side of the mounting board 18 projects light away from the open top 16 toward the closed bottom of the housing 12.

A reflector 20 is received in the recess of the housing 12 and is juxtaposed between the closed bottom of the housing 12 and the light mounting board 18. Accordingly, light projected from the second array of lights 24 on the lower side of the mounting board 18 is received on the reflector 20.

In the first embodiment of the assembly 10 shown FIGS. 1 through 4, the light mounting board 18 has a circular shape with a diameter less than an inside diameter of the base housing 12.

A diffuser lens 26 resides within the recess of the base housing 12. As will be described in detail, the diffuser lens 26 receives light from the second array of lights 24 but not from the first array of lights 22. In the embodiment shown in FIGS. 1 through 4, the diffuser lens 26 is in the form of a circular ring having an inner diameter slightly larger than the diameter of the light mounting board 18. The diffuser lens 26 may be fabricated from polycarbonate or other material.

A cover lens 30 covers the open top 16 of the base housing 12 and, accordingly, also covers the light mounting board 18 and the reflector 20 within the recess of the base housing 12. The center portion of the cover lens 30 over the first array of lights may have optics to disperse the light. The cover lens 30 may be snap-fit or otherwise secured to the upstanding edge 14 of the housing 12. The cover lens 30 may be fabricated from polycarbonate or other material.

As best seen in the sectional view of FIG. 4, the reflector 20 includes at least two reflective surfaces which are in angular relationship to each other. The reflective surfaces are also in angular relationship to the mounting board 18. The reflector 20 includes a first reflective surface 32 at an acute angle to the lower side of the mounting board 18. The reflector 20 also includes a second reflective surface 34 which is at an acute angle to the first reflective surface 32.

The arrows 36 shown in FIG. 4 illustrate the path of light from the second array 24. Light passes from the second array of lights to the first reflective surface 32, thereafter to the second reflective surface 34, and thereafter to and through the diffuser lens 26. Finally, the ring of light passes through the cover lens.

During use, the second array may provide the tail light function with LEDs illuminated at all times. The first array may provide the stop and turn light functions. During activation of the stop function, the second array may provide greater illumination than provided during tail light function.

A plurality of posts 38 extend upward from the closed bottom of the housing 12 to support the light mounting board 18 which may be fastened thereto by fasteners 40.

The reflector 20 may be fastened or otherwise secured to the mounting board 18.

The housing 12 may include recesses for wiring terminals 42 which are in communication with the light mounting board 18 and the light arrays 22 and 24 in order to provide power to the light arrays. The wiring terminals 42 are, in turn, in communication with the electrical system of the vehicle (not shown).

Figure 5:
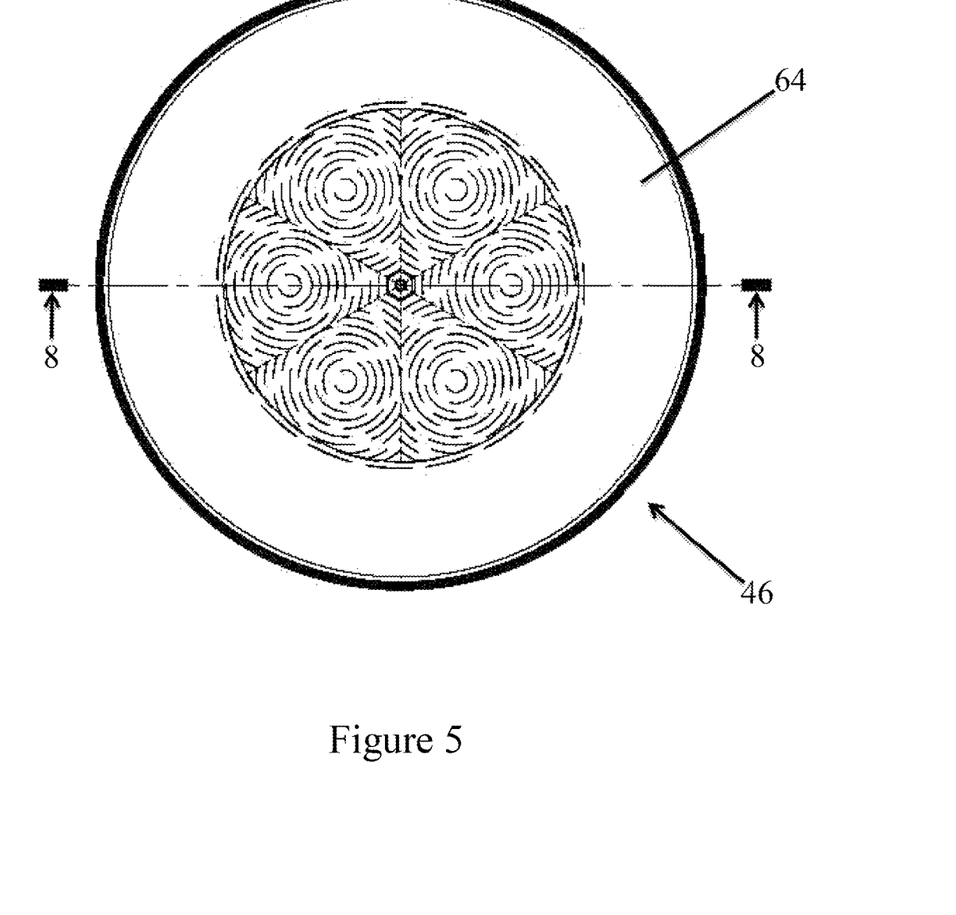
FIG. 5 illustrates a top view.
Figure 6:
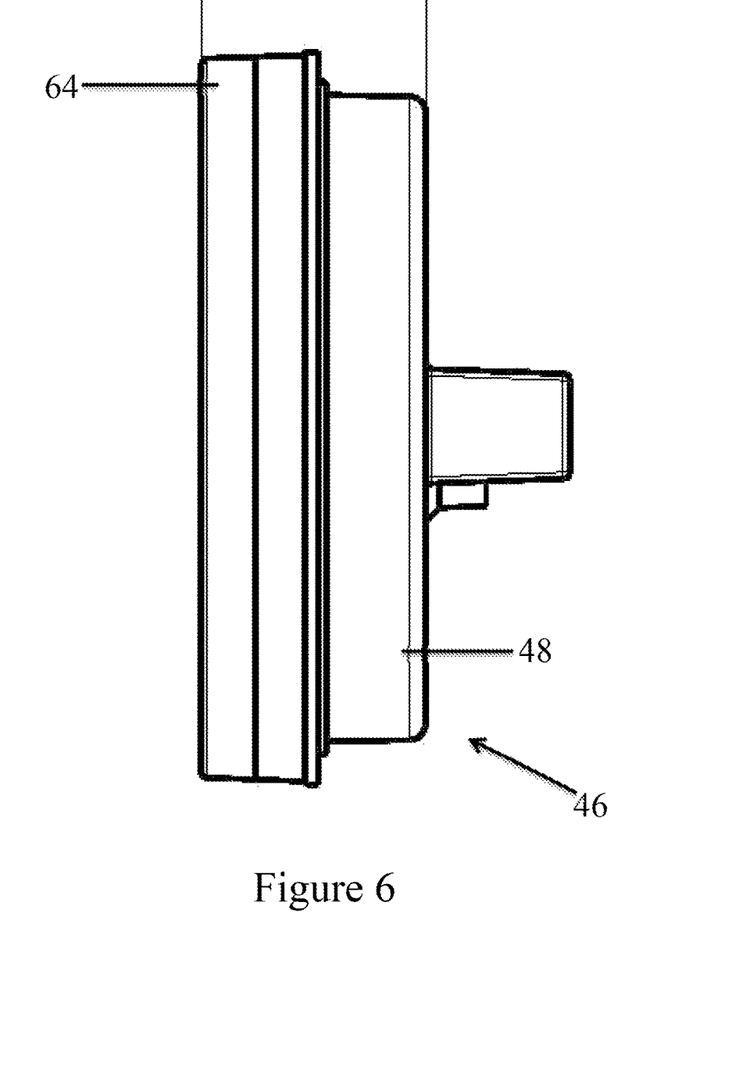
FIG. 6 illustrates a side view.
Figure 7:
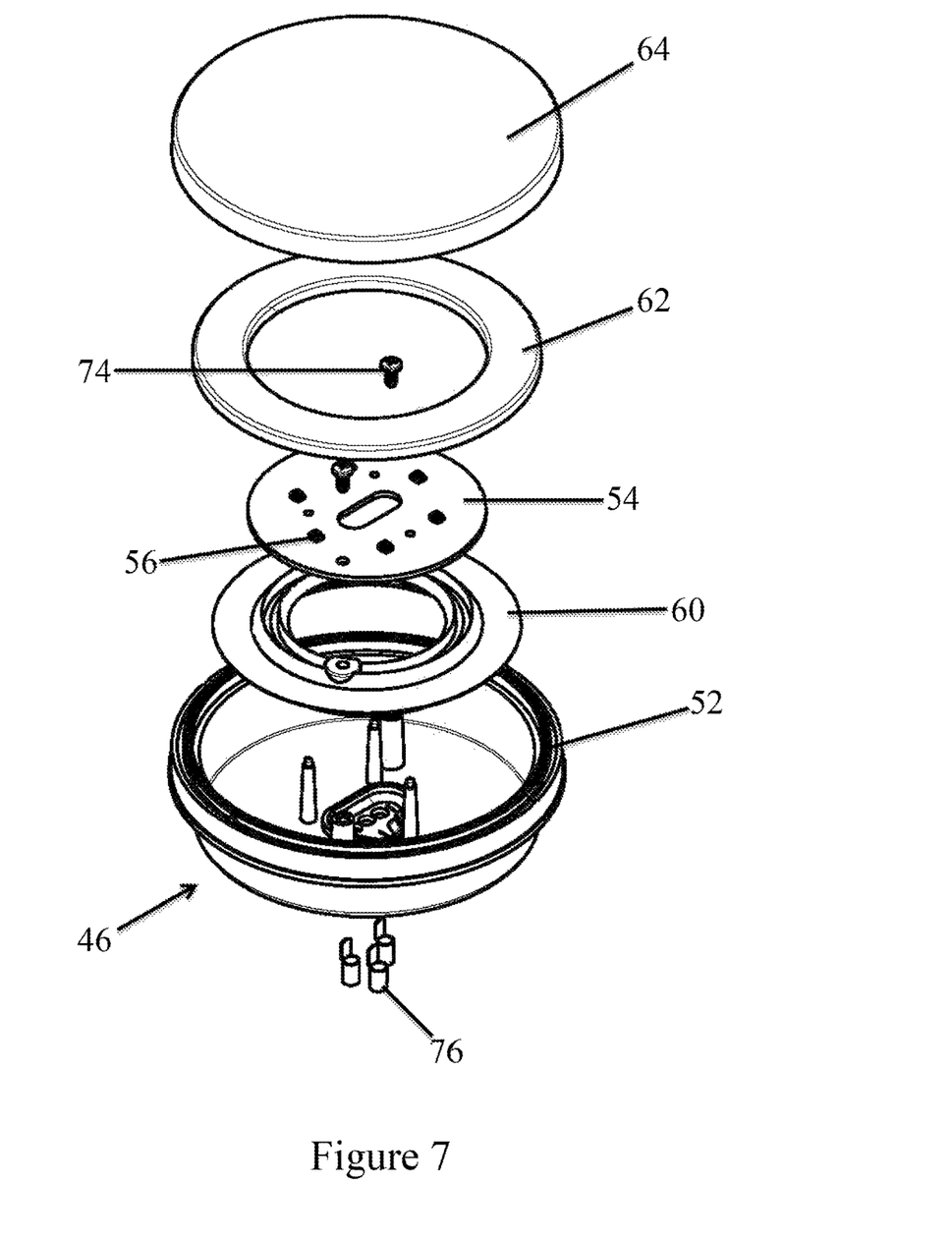
FIG. 7 illustrates an exploded view.
Figure 8:
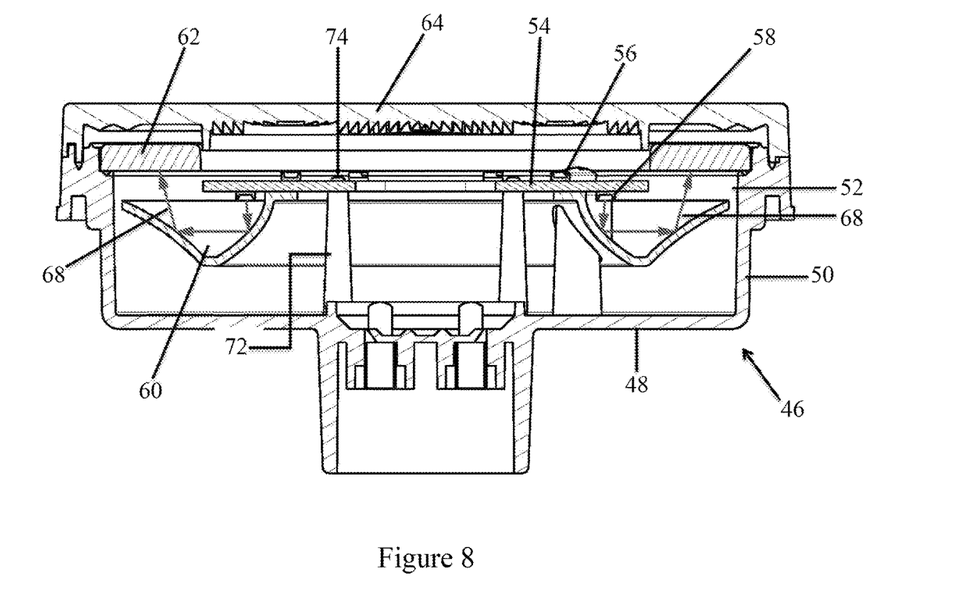
FIG. 8 illustrates a sectional view taken along section line 8-8 of FIG. 5 of a second preferred embodiment of a vehicle light assembly.

FIG. 5 illustrates a top view, FIG. 6 illustrates a side view, FIG. 7 illustrates an exploded view, and FIG. 8 illustrates a sectional view taken along section line 8-8 of FIG. 5 of a second preferred embodiment of a vehicle light assembly 46. The assembly 46 includes a base housing 48 having a recess and an upstanding edge 50. The upstanding edge 50 forms a cylinder with a closed bottom and an open top 52.

A light mounting board 54, which is substantially planer, fits within and is received within the recess of the base housing 48. The light mounting board 54 includes a lower side and an opposed upper side, visible in FIGS. 7 and 8. The light mounting board 54 may be in the form of a printed circuit board or circuit boards.

A first array of lights 56 is arranged on the upper side of the light mounting board 54 which projects light upward from the recess towards the open top 52. A second array of lights 58 on the lower side of the mounting board 18 projects light away from the open top 52 toward the closed bottom of the housing 48.

A reflector 60 is received in the recess of the housing 48 and is juxtaposed between the closed bottom of the housing 48 and the light mounting board 54. Accordingly, light projected from the second array of lights 58 on the lower side of the mounting board 18 is received on the reflector 60.

In the embodiment shown in FIGS. 5 through 8, the planar light mounting board 54 has a circular shape with a diameter less than an inside diameter of the base housing 48.

A diffuser lens 62 resides within the recess of the base housing 48. The diffuser lens 62 receives light from the second array of lights 58 but not from the first array of light 56. In the embodiment shown in FIGS. 5 through 8, the diffuser lens 62 is in the form of a circular ring having an inner diameter slightly larger than the diameter of the light mounting board 54. The diffuser lens 62 may be fabricated from polycarbonate or other material.

A cover lens 64 covers the open top of the base housing 48 and, accordingly, also covers the light mounting board 54 and the reflector 60 within the recess of the base housing 48. The center portion of the cover lens 64 over the first array of lights may have optics to disperse the light. The cover lens 64 may be snap-fit or otherwise secured to the upstanding edge 50 of the housing 48. The cover lens 64 may be fabricated from polycarbonate or other material.

The reflector 60 includes at least two reflective surfaces which are in angular relationship to each other. The reflective surfaces are also in angular relationship to the mounting board.

The reflector 60 includes a first reflective surface 66 at an acute angle to the lower side of the mounting board 54. The reflector 60 also includes a second reflective surface 68 which is at an acute angle to the first reflective surface 66. In contrast to the embodiment 10 shown in FIGS. 1 through 4, the embodiment of the assembly 46 shown in FIGS. 5 through 6 includes reflective surfaces that are arched or curved.

The arrows 68 shown in FIG. 8 illustrates the path of light from the second array 58. Light passes from the second array 58 of lights to the first reflective surface 66, thereafter to the second reflective surface 68, and thereafter to and through the diffuser lens 62.

A plurality of posts 72 extend upward from the closed bottom of the housing 48 in order to support the light mounting board 54 which may be fastened thereto by fasteners 74. Finally, the ring of light passes through the cover lens 64.

The housing 48 may include recesses for wiring terminals 76 which are in communication with the light mounting board 54 and the light arrays in order to provide power to the light arrays. Wiring terminals 76 are, in turn, in communication with the electrical system of the vehicle (not shown).

Figure 9:
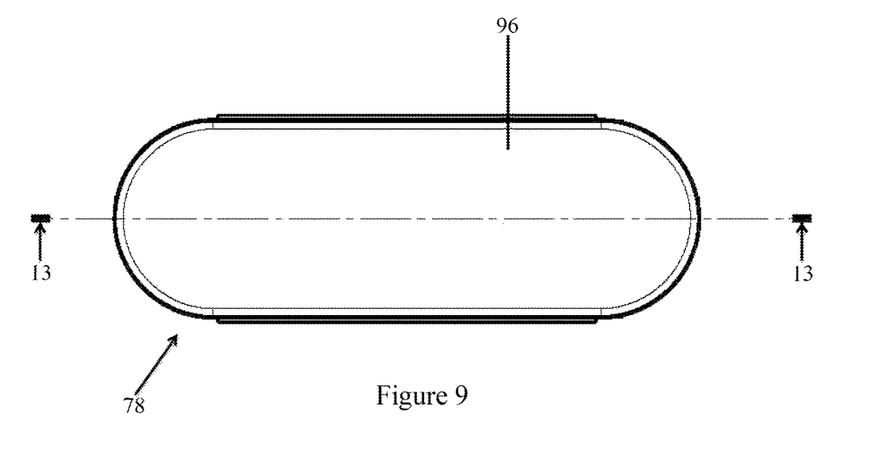
FIG. 9 illustrates a top view.
Figure 10:
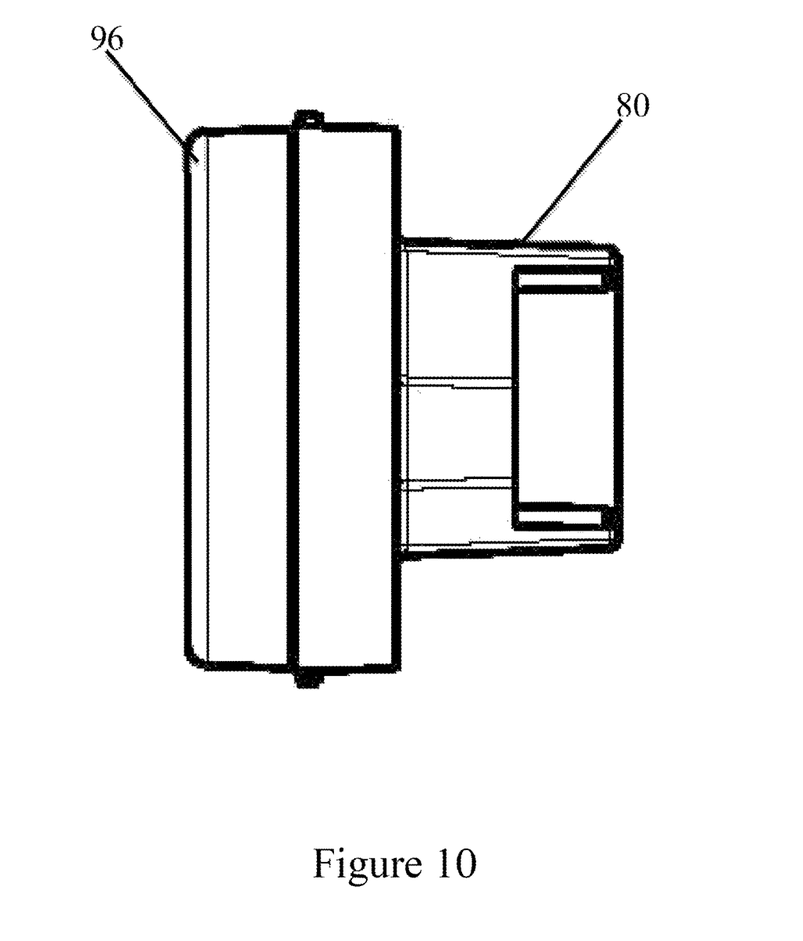
FIG. 10 illustrates a side view.
Figure 11:
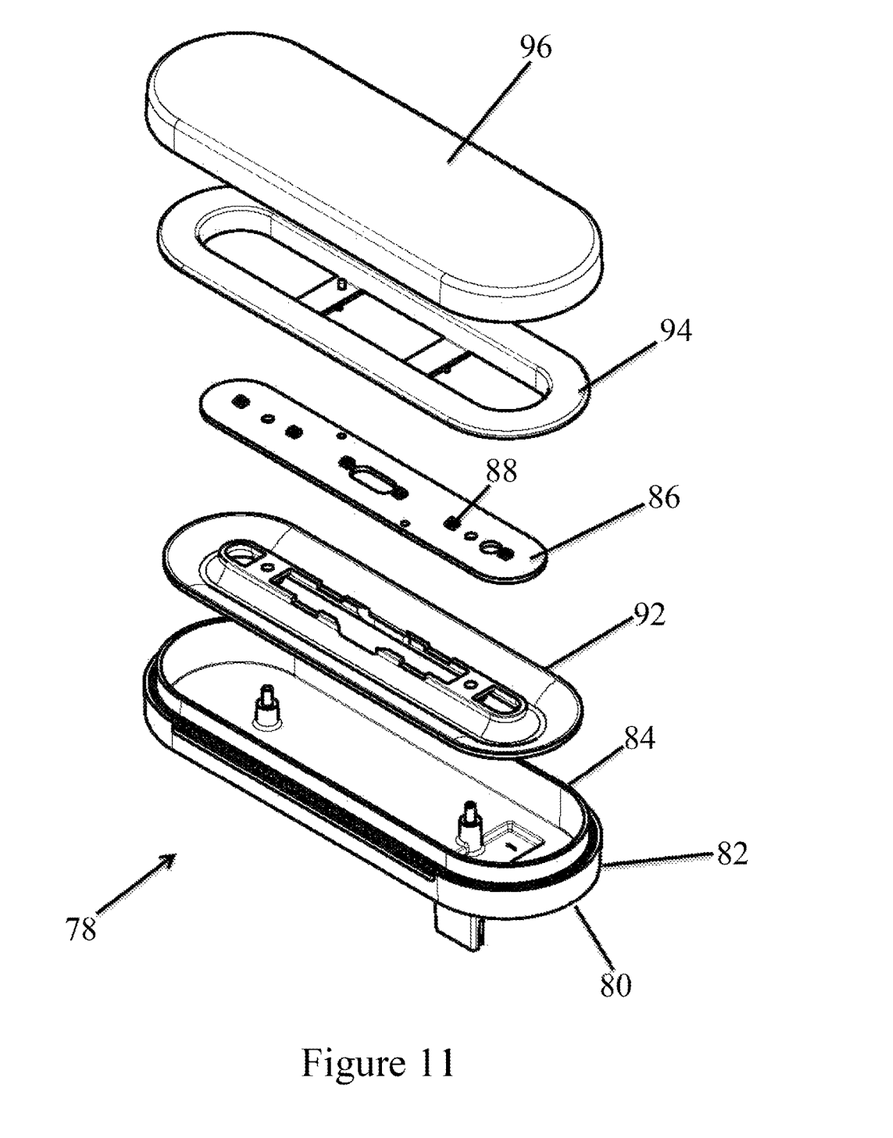
FIGS. 11 and 12 illustrate alternate exploded views.
Figure 12:
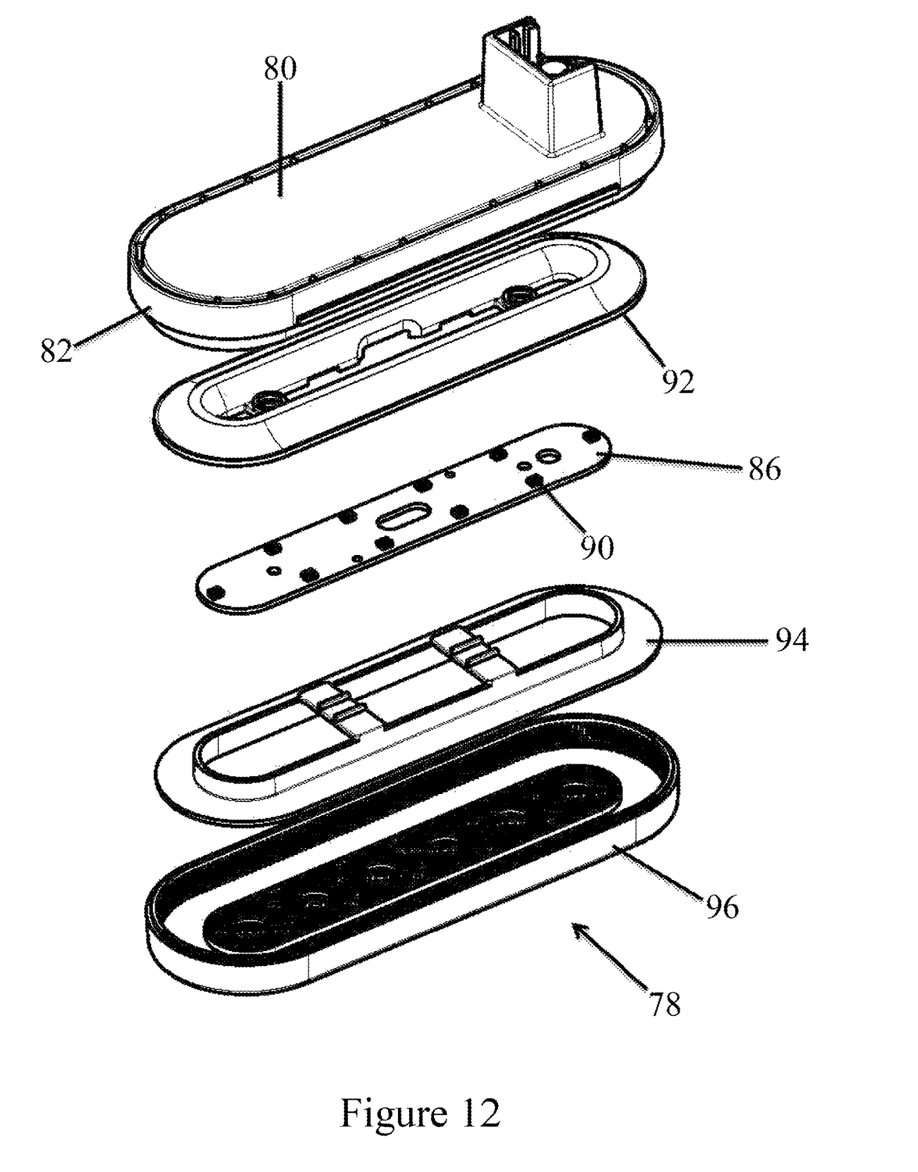
Figure 13:
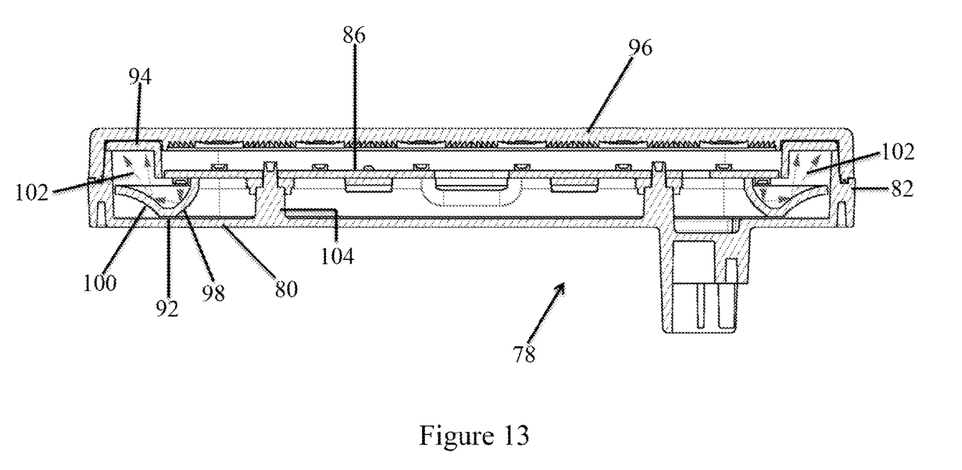
FIG. 13 illustrates a sectional view taken along section line 13-13 of FIG. 9 of a third preferred embodiment of a vehicle light assembly.

FIG. 9 illustrates a top view, FIG. 10 illustrates a side view, FIGS. 11 and 12 illustrate alternate exploded views, and FIG. 13 illustrates a sectional view taken along section line 13-13 of FIG. 9 of a third preferred embodiment of a vehicle light assembly 78 with multiple light arrays. The light assembly 78 includes a base housing 80 having a recess and an upstanding edge 82. The upstanding edge 82 forms a tube with a closed bottom and an open top 84.

A light mounting board 86, which is substantially planar, fits within and is received within the recess of the base housing 80. A light mounting board 86 includes a lower side visible in FIG. 12 and an opposed upper side, visible in FIG. 11. The light mounting board 86 may be in the form of a printed circuit board or circuit boards.

A first array 88 of lights is arranged on the upper side of the light mounting board 86 which projects light upward from the recess towards the open top 84. A second array 90 of lights on the lower side of the mounting board 86 projects light away from the open top 84 toward the closed bottom of the housing 80.

A reflector 92 is received in the recess of the base housing 80 and is juxtaposed between the closed bottom of the housing 80 and the light mounting board 86. Accordingly, light projected from the second array 90 of lights on the lower side of the mounting board 86 is received on the reflector 92.

In the embodiment shown in FIGS. 9 through 13, the light mounting board 86 has an oblong ring shape with an external edge less than the edge of the base housing 80.

A diffuser lens 94 resides within the recess of the base housing 80. The diffuser lens 94 receives light from the second array 90 of lights but not from the first array 88 of lights. In the embodiment shown in FIGS. 9 through 13, the diffuser lens 94 is in the form of an oblong ring.

A cover lens 96 covers the open top of the base housing 80 and, accordingly, also covers the light mounting board 86 and the reflector 92 within the recess of the base housing 80. The center portion of the color lens over the first array of lights 88 may have optics to dispense the light. The cover lens 96 may be snap-fit or otherwise secured to the upstanding edge 82 of the housing. The cover lens 96 may be fabricated from polycarbonate or other material.

As best seen in the sectional view in FIG. 13, the reflector 92 includes at least two reflective surfaces which are in angular relationship to each other. The reflective surfaces are also in angular relationship with the mounting board 86. The reflector 92 includes a first reflective surface 98 at an acute angle to the lower side of the mounting board 86. The reflector 92 also includes a second reflective surface 100 which is at an acute angle to the first reflective surface 98.

The arrows 102 shown in FIG. 13 illustrate the path of light from the second array 90. Light passes from the second array of lights 90 to the first reflective surface 98, thereafter to the second reflective surface 100 and thereafter to and through the diffuser lens 94. Finally, the ring of light passes through the cover lens 96. A plurality of posts 104 extend upward from the closed bottom to support the light mounting board 82 which may be fastened thereto by fasteners.

Whereas, the present invention has been described in relation to the drawings attached hereto, it should be understood that other and further modifications, apart from those shown or suggested herein, may be made within the spirit and scope of this invention.

What is claimed is:

1. A vehicle light assembly with multiple light arrays, which assembly comprises:
   a base housing having a recess and an upstanding edge forming an open top;
   a light mounting board in said recess having a lower side and an opposed upper side;
   a first array of lights on said upper side of said mounting board projecting light up toward said open top;
   a second array of lights on said lower side of said mounting board projecting light away from said open top;
   a reflector received in said recess wherein said reflector reflects light projected from said second array of lights toward said open top; and
   a diffuser lens within said housing receiving light from said second array and from said reflector but not from said first array.

2. A vehicle light assembly with multiple light arrays as set forth in claim 1 wherein said diffuser lens is in the shape of a ring having an inner diameter slightly larger than a diameter of said light mounting board.

3. A vehicle light assembly with multiple light arrays as set forth in claim 1 wherein said light mounting board is above said reflector.

4. A vehicle light assembly with multiple light arrays as set forth in claim 1 including a cover lens covering said open top of said housing, said light mounting board, and said reflector.

5. A vehicle light assembly with multiple light arrays as set forth in claim 1 wherein said reflector has at least two reflective surfaces in angular relationship with each other.

6. A vehicle light assembly with multiple light arrays as set forth in claim 5 wherein said at least two reflective surfaces include a first reflective surface at an acute angle to said lower side of said mounting board.

7. A vehicle light assembly with multiple light arrays as set forth in claim 6 wherein said at least two reflective surfaces include a second reflective surface at an acute angle to said first reflective surface.

8. A vehicle light assembly with multiple light arrays as set forth in claim 1 wherein said first array of lights are light emitting diodes.

9. A vehicle light assembly with multiple light arrays as set forth in claim 1 wherein said second array of lights are light emitting diodes.

10. A vehicle light assembly with multiple light arrays as set forth in claim 1 wherein said base housing, said light mounting board, and said reflector are circular.

11. A vehicle light assembly with multiple light arrays as set forth in claim 1 wherein said base housing, said lighting mounting board and said reflector are shaped as an oblong ring.

12. A vehicle light assembly with multiple light arrays as set forth in claim 1 including one or more posts in said recess of said housing supporting said light mounting board.

13. A vehicle light assembly with multiple light arrays as set forth in claim 12 including one or more fasteners connecting said mounting board to said one or more posts.

14. A vehicle light assembly with multiple light arrays as set forth in claim 1 including at least one electrical connector on said base housing connected to said light mounting board to supply power to said light arrays.

15. A vehicle light assembly with multiple light arrays, which assembly comprises:
   a cylindrical base housing having a closed bottom and an open top;
   a light mounting board within said cylindrical housing having a lower side and an opposed upper side;
   a first array of lights mounted on said upper side projecting light up towards said open top;
   a second array of lights mounted on said lower side projecting light towards said closed bottom;
   a reflector in said cylindrical housing below said light mounting board reflecting, light projecting from said second array of lights toward said open top; and
   a diffuser lens within said base housing receiving light from said second array and from said reflector but not from said first array.

16. A vehicle light assembly with multiple light arrays as set forth in claim 15 including a diffuser lens within said cylindrical housing above said reflector and receiving light from said second array.

17. A vehicle light assembly with multiple light arrays as set forth in claim 16 wherein said diffuser lens is in the shape of a ring having an inner diameter slightly larger than a diameter of said light mounting board.

18. A vehicle light assembly with multiple light arrays as set forth in claim 15 wherein said reflector has at least two reflective surfaces in angular relationship to each other.

19. A vehicle light assembly with multiple light arrays, which assembly comprises:
- a base housing having a recess and an upstanding edge forming an open top;
- a light mounting board in said recess having a lower side and an opposed upper side;
- a first array of lights on said upper side of said mounting board projecting light up toward said open top;
- a second array of lights on said lower side of said mounting board projecting light away from said open top; and
- a reflector received in said recess having at least two reflective surfaces in angular relationship with each other having a first reflective surface at an acute angle to said lower side of said mounting board, a second reflective surface at an acute angle to said first reflective surface, wherein said reflector reflects light projected from said second array of lights to said first reflective surface, thereafter to said second reflective surface and thereafter toward said open top.

\* \* \* \* \*